Sept. 8, 1959   F. F. SLACK   2,903,690
PHOTOCELL PROBE TARGET SELECTOR
Filed Dec. 16, 1954   3 Sheets-Sheet 2

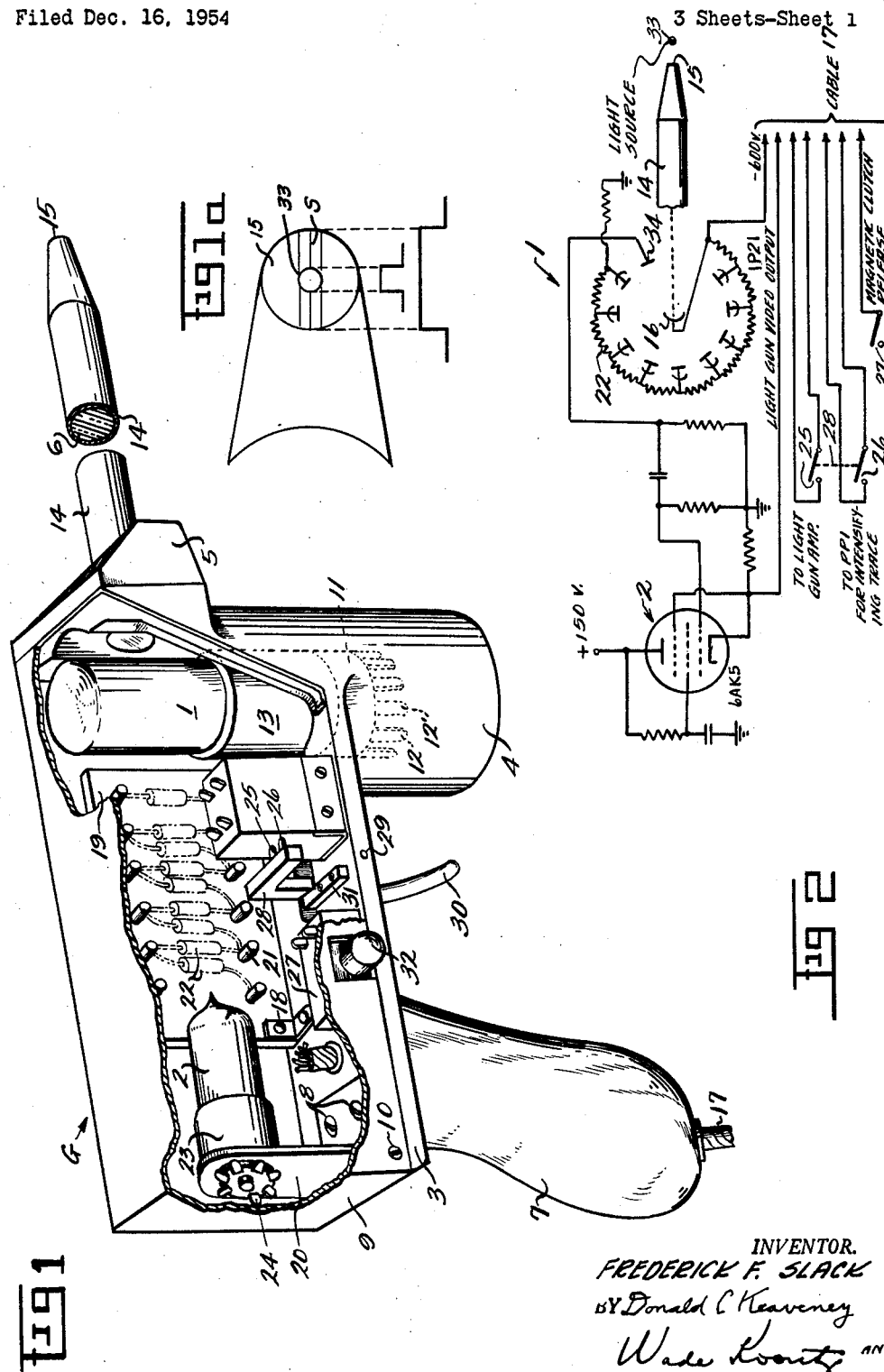

INVENTOR.
FREDERICK F. SLACK
BY Donald C Keaveney
Wade Koontz  AND
ATTORNEYS

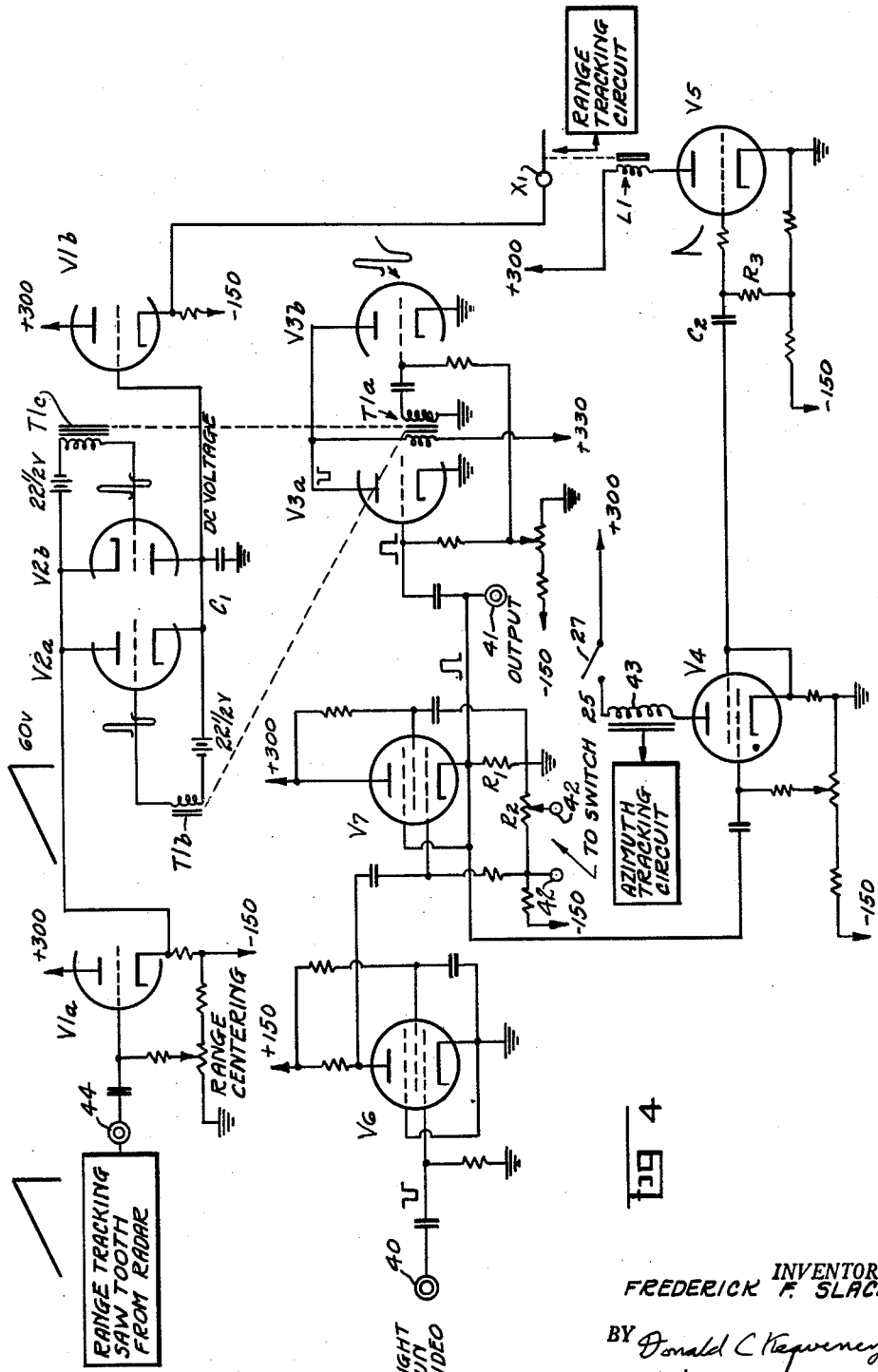

United States Patent Office

2,903,690
PHOTOCELL PROBE TARGET SELECTOR

Frederick F. Slack, Stoneham, Mass., assignor to the United States of America as represented by the Secretary of the Air Force Application December 16, 1954, Serial No. 475,849

10 Claims. (Cl. 343—5)

(Granted under Title 35, U.S. Code (1952), sec. 266)

The invention described herein may be manufactured and used by or for the United States Government for governmental purposes without payment to me of any royalty thereon.

This invention relates to a photocell target selector constructed in the form of a "light gun" and intended primarily for isolating a single target on a P.P.I. radar scope and for generating a range azimuth gate to inclose said target. The procedure is to point the probe at a target on the scope so that the illuminated target activates a photomultiplier tube in the "light gun." This automatically sends out an electronic pulse which may be used to trigger a gate at the proper instant for reading a height computer or to control any other component or associated circuitry which may be desired. A gate can also be taken from the intensified P.P.I. time base if desired. If the time base is made visible the gun will generate a gate which will inclose any target and which may be used to gate the originally received radar video.

The orthodox method of isolating any single target on a P.P.I. scope is to manipulate two precision potentiometer controls, one for range and one for azimuth. This requires two manual operations and several vacuum tubes for both the range and azimuth gate generator and also an electronic circuit for obtaining a coincidence between the two gates and the video signal.

The present invention comprises simply a photomultiplier tube and a cathode follower output located in the gun. The output is fed through a flexible cable to a one stage amplifier having a cathode follower output. The output of this cathode follower is a range and azimuth gate.

If the photocell is activated by the intensified P.P.I. time base, this gate incloses the video signal. This gate may be used directly for any desired purpose or it may gate the original radar video for further use. Either the gun output or the gated radar video may be used to gate the output of a height computer for proper reading time coincidence. The gun output or radar video may also be used to trigger a tracking gate slewing circuit the output of which in turn triggers servo tracking apparatus at the range and azimuth of the isolated target.

Thus it is an object of the present invention to provide a device which isolates a target or generates a range azimuth electronic gate in a single operation.

It is a further object of the invention to provide a means of isolating a target for generating a range azimuth gate in one scan of the radar antenna.

It is another object of the invention to provide a means for isolating a target for generating a range azimuth gate with greater speed and precision than has heretofore been possible.

The invention, both as to its organization and method of operation, as well as additional objects and advantages thereof, will best be understood from the following description when read in connection with the accompanying drawings wherein like reference characters refer to like parts throughout and in which:

Figure 1 is a perspective view, partly broken away and in section, of a probe or "light gun" embodying the present invention.

Figure 1a is a diagrammatic view of the "light gun" tip in relation to target presentation.

Figure 2 is a schematic circuit diagram of the components of the probe shown in Figure 1.

Figure 4 is a schematic diagram showing how the "light gun" may be used to trigger a tracking gate slewing circuit.

Figure 3:
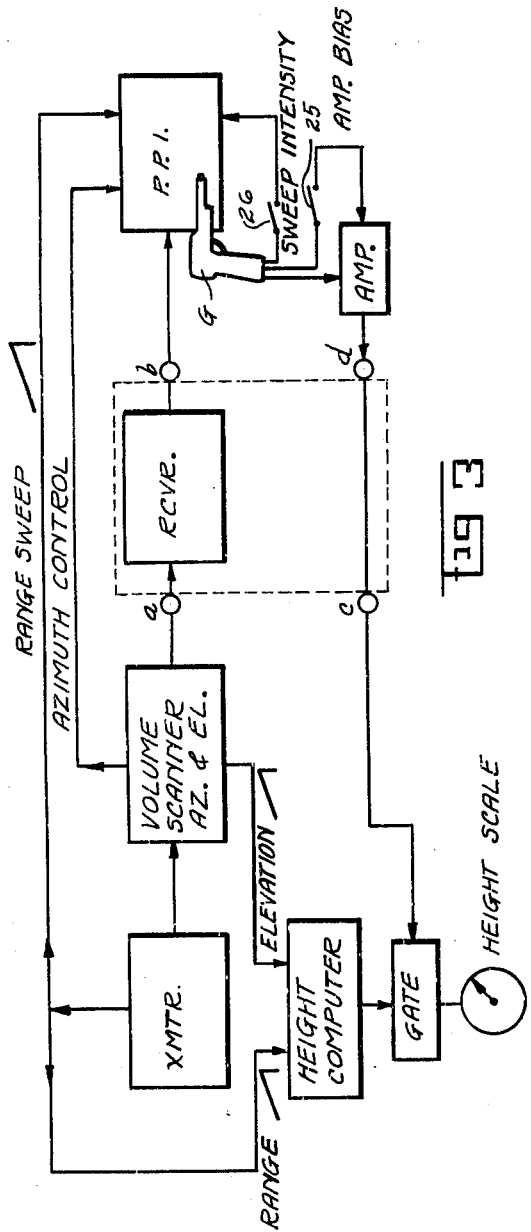
Figure 3 is a block diagram showing how the probe may be used in conjunction with a P.P.I. radar scope to generate a gate for a height computer.

Turning now to the drawings and in particular to Figures 1 and 2 thereof, the photocell probe comprises a photoelectric electron multiplier tube 1, which may for example be a type 1P21, a cathode follower tube 2, which may be a 6AK5 and connecting circuitry positioned within an inclosing housing. The inclosing housing 9 is mounted on a metal frame 3 having a well 4 at the forward end thereof. The well continues forwardly in a boss 5 which has a threaded opening therein to receive the threaded end of a rod 6 made of Lucite or other light conducting material, having a light impervious cover 14 wrapped around it, and having a light receiving tip 15. A pistol grip handle 7 is attached by screws 8 to the frame 3 for convenient handling of the device. A cover 9 is attached to the frame 3 by means of screws 10 and incloses the components and the wiring of the device.

Within the probe housing 9, one or more angle irons 18 support an insulator resistor mount 19. Posts 21 on the resistor mount 19 provide supports for the nine tube resistors 22 of the tube 1. Other angle irons, not shown, support another insulator tube mount 20 for the tube 2. Spring contact tabs 24 on the tube mount 20 are engaged by contact pins projecting from the base 23 of the cathode follower tube 2. The signal output from the probe and the power supply to its tubes are conducted by a flexible cable 17 which extends from the butt of the gun handle 7.

A pair of ganged push switches 25 and 26 are actuated simultaneously by an L extension 28 from a trigger 30. The trigger 30 is pivoted in the frame 3 and is arrested by a stop 31 which is secured to the frame 3. The switch 25 controls a light gun output amplifier to be described below and may be opened at any time so that the gun will not produce a signal in response to an extraneous or undesired light source. The switch 26 controls the circuit for intensifying the P.P.I. trace of the scope. If this switch is open the time base itself will not be visible and only the usual target reflected pip will appear on the scope. If the switch is closed so as to intensify the time base trace to the point where it is just visible, the effect at the location of the pip will be to intensify and enlarge the light image to which the phototube will respond along the time base sweep. The increase in light area around the normal target pip provides the isolating gate signal for the original target pip. Of course, if it is desired to use the gun merely to reproduce the original video appearing on the scope, the two switches 25 and 26 will not be ganged but would be separately actuated so that 25 could be closed while 26 was open.

Figure 1a illustrates the size relation of a normal target pip 33 and the tip 15 of the gun. Since the tip of the gun is larger than a normal target pip, it may entirely surround it. In prefered use the gun is held so that its axis is perpendicular to the screen of the display tube which means that the light receiving face of the tip 15 of the gun will be flush with the screen. If the P.P.I. scanning time base S is not intensified, the gun receives light only at times which are range equivalents of the area within the target pip. If, however, by closing switch 26, the scanning time base S of the P.P.I. is intensified to the point where it will itself activate the photocell, then the photocell will be activated at times corresponding to the range equivalents of an area corresponding to that of the entire tip of the gun. This will obviously generate a gating signal which incloses the original target pip. Thus the switch 26 controls the nature of the light gun output.

As seen in Figure 1, a separate switch 27 is actuated by a push button 32 within normal reach of the operator's thumb. This switch 27 is a manual release for the magnetic clutch circuit for correctly positioning the azimuth tracking gate in the circuits to be more fully described below in conjunction with Figure 4.

Referring now particularly to Figure 2, it is seen that light from a source 33 such as the representation of a target to be isolated on a radar scope enters the tip 15 of the light conducting rod 6 and falls upon the cathode 16 of the electron multiplier tube 1. The tube dynodes multiply the electron current from the cathode 16 and the tube output signal which is a negative pulse at its plate 34 is passed to the control grid of the cathode follower tube 2 by means of any suitable coupling network. Output signal is taken from the cathode circuit of tube 2 and is conducted away from the assembly through cable 17. It is apparent that the light gun functions to convert a light input signal into an electrical output signal identical in time occurrence or phase to the light input. Due to the coincidence in time of these signals, the output may be used as a range azimuth gate signal to isolate the original target signal which gave rise to the light input to the gun. It is, of course, desirable that the gun be used with a radar system either having a scope the phosphor of which has a relatively rapid decay time or having a relatively low pulse repetition frequency or having both of these features. This permits sufficient variation in the intensity of the P.P.I. target pip so that the output of the light gun is a usable video signal. It should be pointed out, however, that the light gun is sufficiently sensitive so that the light produced by a reflected target pulse during a single scan of the beam is sufficient to produce a usable output from the gun.

Figure 3A:
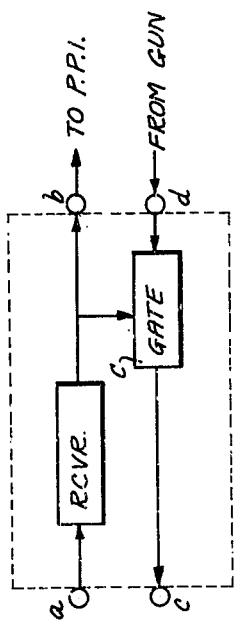
Figure 3a is a block diagram of a circuit which may be used with that of Fig. 3 to pass radar video as a gate for the height computer.

Figures 3 and 3a illustrate one basic application of the light gun of Figures 1 and 2. In this system a volume scanner varies the position of the radar antenna both in azimuth and in elevation. With suitable duplexing the same antenna is used by both the transmitter and receiver of the system as is the conventional practice. An azimuth control signal is derived from the volume scanner and applied to the plan position indicator cathode ray tube to synchronize the angular position of its beam with that of the antenna. Similarly a range sawtooth sweep signal is derived from the transmitter and applied to the P.P.I. Reflected target pulses are fed from the receiver via terminal b to the P.P.I., all in conventional manner. Simultaneously an elevation sawtooth from the volume scanner and the range sawtooth from the transmitter are both applied to a height computer which is preferably an electronic analogue computer having a continuous output which is the height as computed from the instantaneous values of the elevation and slant range sawtooth voltages. This continuous output is fed to a normally nonconducting gate circuit. The light gun output is fed through an amplifier and used to control this gate circuit so that the height output will appear at the height scale only at times when the input to the height computer corresponds to the range and elevation of the desired target as selected by the light gun. Thus having isolated a selected target by the light gun it is possible to use its video output to trigger the gate of the height computer circuit at the proper instant to immediately read the height or altitude of the selected target.

The operation of Figure 3 assumes that switch 25, which controls the bias of the light gun amplifier, is closed so that the bias will be above cutoff and the amplifier will conduct. At times when the light gun is not in use this switch may be opened to prevent a spurious response to extraneous light sources. It is also assumed that switch 26, which controls a circuit for intensifying the P.P.I. time base sweep, is open so that only the normal target pip will appear on the screen. If this switch is closed the time base is intensified until it becomes visible and will generate a gate signal which incloses the target as explained in connection with Figure 1a. This gate signal from the intensified P.P.I. time base may be used in conjunction with the circuit of Figure 3a.

The circuit of Figure 3a may replace that portion of the circuit of Figure 3 which is inclosed in the dashed block between terminals a, b, c, and d. In this case radar video from the receiver is passed both to the P.P.I. and to a normally closed gate circuit C. When the light gun is activated by the target inclosing gate from the intensified P.P.I. time base, the light gun output activates the gate circuit C so that it will then conduct. Therefore the originally received radar video which is used to produce the target pip on the P.P.I. scope at which the light gun is aimed will also appear at terminal c, the output of gate circuit C. This radar video is fed from terminal c to control the gate of the height computer so that the computer may be read at a time when its output corresponds to the altitude of the selected target. The gating technique of Figure 3a renders the questions of scope phosphor delay time and precision of light gun response less critical since with this circuit it is ultimately the original radar pulse which triggers the gate of the height computer for reading.

The light gun may also be used to trigger servo controlled automatic tracking apparatus by means of the circuit shown in Figure 4.

In the circuit of Figure 4 light gun video signal from cable 17 is fed to input terminal 40 which is capacitively coupled to the control grid of tube V6. V6 may be a 6AC7 sharp cutoff pentode used in a single amplifier stage which inverts the negative input pulse. A positive pulse output is taken from the plate circuit of V6 and is capacitatively coupled to the control grid of tube V7 which may be a 6AG7 used in a cathode follower stage. These two tubes correspond to the amplifier of Figure 3. Output from V7 is taken across the cathode resistor R1 and is fed to three different points. The positive pulse output from the low output impedance cathode follower stage goes first to an output terminal 41 from which connection may be made to any desired external use which might, for example, be the gate circuit C of Figure 3a; secondly the cathode follower output is capacitatively coupled to the grid of blocking oscillator tube V3a; thirdly the cathode follower output is capacitatively coupled to the grid of thyratron V4.

It should be noted that two terminals of potentiometer R2 which is a part of the cathode biasing resistance of the cathode follower V7 are connected to terminals 42 which in turn connect to the two terminals of switch 25 of Figure 2. Hence when switch 25 is closed a part of the resistance R2 is shunted out of the cathode circuit which as shown will make the absolute value of the negative bias applied to the grid of V7 less and thus will permit it to conduct. With switch 25 open the tube is biased beyond cutoff in order to prevent spurious signals due to extraneous light sources.

As noted, output from the cathode follower is fed to the control grid of V4 which may be a thyratron type 2050. This light gun video pulse is sufficient to trigger the thyratron so that it fires or begins to conduct.

Thyratron plate current flows through the coil 43 of a magnetic clutch which when actuated shifts the antenna drive control from the normal scanning drive to a tracking apparatus drive. Hence positioning of the azimuth tracking gate is accomplished by this magnetic clutch which transfers the switch contacts of the azimuth tracking gate trigger from its keyed position rotating at the speed of the antenna to a position which will follow a tracking servo unit. Since the magnetic clutch is activated by the thyratron V4, which is triggered by the light gun video, this transfer action occurs at the azimuth of the selected aircraft target. A push button switch 27 is connected in series with the thyratron plate circuit for releasing the clutch. This allows the clutch to snap back into its keyed position and the azimuth gate is again rotating with the radar antenna and is ready to pick up the next target. Since the details of the clutch and transfer mechanism will vary with different external tracking apparatus and do not form a part of this invention they have not been illustrated beyond the clutch coil 43. For the purposes of this invention the clutch coil 43 provides an azimuth tracking gate signal which may be utilized in any desired manner, one example of which has been suggested above.

Signal from cathode follower V7 is also capacitatively coupled to the grid of V3a, which may be half of a twin triode such as the 6SN7, the other half of which, V3b, is used with V3a in a conventional blocking oscillator stage. The light gun video pulse triggers the blocking oscillator V3a and V3b the output from which is taken from transformer T1. T1a is the blocking oscillator transformer and has mounted on its core the windings T1b and T1c in each of which an output pulse occurs when the blocking oscillator is triggered. These output pulses are applied to the grids of tubes V2a and V2b which constitute a clamping circuit to be described below. The purpose of this circuit is the charging of the condenser C1 to the proper voltage necessary to control the generation of a tracking gate at the range of the target selected by the light gun.

The range tracking sawtooth sweep from the radar is applied to terminal 44 and capacitatively coupled to the grid of V1a which may be half of a 6SN7 triode used as a cathode follower input stage. The range sawtooth is taken from the cathode of V1a and is applied to the plate of V2a and to the cathode of V2b. V2a and V2b may also be a 6SN7 here connected in a clamping circuit. Both of these triodes remain cut off by the 22½ volt bias batteries in their grid circuits until a signal is induced across the transformer windings T1b and T1c. Since these windings are placed on the same core as the blocking oscillator transformer T1a, a positive pulse appears on the grids of V2 whenever the blocking oscillator V3 is fired by the light gun video. At the time of the pulse on the grids of V2, current flows through V2 charging condenser C1 to the instantaneous value of sawtooth voltage at the cathode of V1a. If the top of C1 is more negative than the instantaneous value of the sawtooth at the time of the pulse, charging current will flow through V2a; if C1 is more positive, however, the clamping action will be through V2b. A sample of C1 voltage is applied through cathode follower output V1b and relay contact X1 to any desired external range tracking circuit. The output at X1 constitutes a range gate. Relay L1 is actuated by V5 plate current and remains closed for a short period of time determined by the time constant in the grid circuit R3—C2. This action is initiated by the light gun video which triggers the thyratron V4 the cathode of which is capacitatively coupled to the grid of V5 by C2. The closing of contact X1 of relay L1 by the video permits the sample of range tracking sawtooth voltage from C1 to be applied to trigger any desired external range tracking apparatus at the correct initial range value coinciding in time with the azimuth tracking signal output from the magnetic clutch coil 43. The relay L1 and magnetic clutch release 27 permit the circuit to be isolated from the external tracking apparatus once the latter has been properly set in operation.

Thus it is seen that because of the light gun's ability to generate an electronic gate which will inclose any single target on the P.P.I. scope, it is possible to isolate a video signal, as shown in Figure 3a, on which height information, for example, may be desired. It is further possible to use the same gun in conjunction with the circuit of Figure 4 for the slewing of tracking gates for the purpose of triggering servo controlled range-azimuth tracking apparatus. It is obvious that the speed and precision of this means of target acquisition will give rise to many important applications in such systems as air traffic control and automatic gun laying. In one example, the controller could use the target selector to correlate the information on the data board with the target on which he desires information. Alternatively, the light gun could be used to correlate the target with a recorded sound track rather than with the data board. The light gun may also serve as an aid to the controller in connecting his headphones and microphones to the communication channel assigned to the selected target. The rapidity of this means of target acquisition makes it extremely valuable to an anticollision operator and as an adjunct to automatic gun laying. The same light gun could be used for each of the above purposes by using a switch to select the operation desired to be controlled by the light gun output. Thus there are many uses for the gun and the examples and embodiments set forth above constitute only an illustration of the presently preferred embodiment of the invention the scope of which is defined solely by the appended claims.

What I claim is:

1. In a radar system having a P.P.I. display tube, means for generating a video signal coincident with the received video signal producing any selected target presentation on the screen of said P.P.I display tube comprising, a frame having a well portion and a forward boss portion, a light conducting rod having one end supported by the frame boss, said rod having a light impervious coat around its sides and having a light receiving tip at its forward end, said tip being adapted to be placed over the light produced in a restricted area on said P.P.I. display tube by the reflected radar pulse from any selected target, a photoelectric electron multiplier tube having its base positioned in said frame well and its cathode positioned to intercept light conducted by said rod and having an anode from which multiplier tube output is taken, a cathode follower tube mounted on said frame and having a control grid to which multiplier tube output is passed and having a cathode from which cathode follower output is taken, a housing attached to said frame and inclosing the elements mounted thereon, a handle attached to said frame, and a cable passing through said handle, said cable having a connection to the cathode of said cathode follower tube whereby the output in said cable will be a video signal coincident in time with the radar video pulse producing the selected target presentation on said P.P.I. display tube.

2. Apparatus as in claim 1 and a trigger pivotally mounted in said frame, said trigger operating a switch, said switch being in a circuit for controlling the bias of an external amplifier to which the output signal from said cable is connected.

3. Apparatus as in claim 2 wherein said trigger also operates a second switch, said second switch being in a circuit for intensifying the time base trace beam of said radar P.P.I. display tube.

4. Apparatus as in claim 3 and including a coincidence circuit, means connecting the output signal of said external amplifier to one input of said coincidence circuit, means to derive a second electrical signal from said radar, means to apply said second electrical signal to a second input of said coincidence circuit, said coincidence circuit having an output terminal at which signal will appear only when both said amplifier output and said second signals are simultaneously applied to its input terminals.

5. In a radar system having a cathode ray display tube, means for generating a video signal coincident with the received video signal producing any selected target presentation on the screen of said display tube comprising, means for intensifying the time base trace beam of said display tube, means to isolate the light produced in any selected restricted area on said display tube, means to convert said isolated light to a first electrical signal, means to apply said first electrical signal to the control element of a normally nonconducting gating circuit so as to cause said circuit to conduct while said signal is applied, and means to apply received video pulses from said radar to the input of said gating circuit, whereby said gating circuit will have as its output only those radar video pulses which are applied to its input while said first electrical signal is applied to its control element.

6. In a radar system having a cathode ray display tube, means to isolate the light produced in a restricted area of said display tube by received video pulses from any selected target, means to convert said isolated light to a first electrical signal, means to derive a range tracking sawtooth signal from said radar, means to apply said range signal to a normally nonconducting clamping circuit, a condenser connected to said clamping circuit so as to be charged thereby, means to apply said first electrical signal to a control element for said clamping circuit so as to render said circuit conducting when said signal is applied, whereby said condenser will be charged to the instantaneous value of said range tracking signal at the time when said first signal is applied to said control element.

7. In a radar system having a cathode ray display tube, means to isolate the light produced in a restricted area of said display tube by received video pulses from any selected target, means to convert said isolated light to a first electrical signal, means to derive a range tracking sawtooth signal from said radar, means to apply said range signal to a normally nonconducting clamping circuit, a condenser connected to said clamping circuit so as to be charged thereby, means to apply said first electrical signal to a control element for said clamping circuit so as to render said circuit conducting when said signal is applied, whereby said condenser will be charged to the instantaneous value of said range tracking signal at the time when said first signal is applied to said control element, a thyratron, a magnetic clutch coil connected to the plate circuit of said thyratron, said clutch being adapted to control the azimuth scanning drive of said radar, and means to apply said first electrical signal to the control grid of said thyratron so that said thyratron will be fired and said clutch coil activated by said first electrical signal, whereby an azimuth control signal will appear in said clutch coil.

8. Apparatus as in claim 7 and including a normally open relay, means connecting said condenser to the output terminal of said relay, and means actuated by the voltage at the cathode of said thyratron for closing said relay, whereby said range tracking signal from said condenser will appear at the output terminal of said relay when said azimuth signal appears at said clutch coil.

9. In a radar system having a cathode ray display tube, means to isolate the light produced in a restricted area on said delay tube, means to convert said isolated light to a first electrical signal, a gate circuit, means to apply said first electrical signal to one input of said gate circuit, means to derive a second electrical signal from said radar, said last recited means consisting of a connection tapping off the video signal from said radar system before said signal is applied to said cathode ray display tube, means to apply said second electrical signal to a second input of said gate circuit, said gate circuit having an output terminal at which signals will appear only when both said first and second signals are simultaneously applied to its input terminal.

10. In a radar system having a cathode ray display tube, means to isolate the light produced in a restricted area on said display tube, means to convert said isolated light to a first electrical signal, a coincidence circuit consisting of a triode clamping circuit normally biased to the nonconducting state and having a capacitor connected between the cathode of said triode and ground, means including a block oscillator connected to be triggered by said first electrical signal and having its output connected to oppose said bias and render said clamping circuit conductive, means for applying a second electrical signal consisting of the range sawtooth sweep from said radar system through a cathode follower stage to said clamping circuit, an output terminal for said coincidence circuit connected through a relay to sample the voltage across said capacitor, said relay being normally open and being actuated to closed position by means triggered by said first electrical signal.

References Cited in the file of this patent

UNITED STATES PATENTS

| | | |
|---|---|---|
| 2,403,729 | Loughren | July 9, 1946 |
| 2,407,169 | Loughren | Sept. 3, 1946 |
| 2,527,753 | McConnell | Oct. 31, 1950 |
| 2,532,338 | Schlesinger | Dec. 5, 1950 |
| 2,557,949 | Deloraine | June 26, 1951 |
| 2,595,141 | Herbst | Apr. 29, 1952 |
| 2,614,226 | Davis | Oct. 14, 1952 |
| 2,636,166 | Herbst | Apr. 21, 1953 |
| 2,668,286 | White | Feb. 2, 1954 |
| 2,855,589 | Baker | Oct. 7, 1958 |